United States Patent [19]

Bortolotti

[11] Patent Number: 4,565,147
[45] Date of Patent: Jan. 21, 1986

[54] MUTUAL AND MULTI-RESTRAINED FIXING FENDER

[76] Inventor: Vanes Bortolotti, Via Balzani, 12-40069 Zola Predosa (Bologna), Italy

[21] Appl. No.: 607,537

[22] Filed: May 7, 1984

[30] Foreign Application Priority Data

Dec. 23, 1983 [IT] Italy .................. 5137/83[U]

[51] Int. Cl.⁴ .............................. B63B 59/02
[52] U.S. Cl. ............................... 114/219
[58] Field of Search ............ 114/219, 220; 405/212, 405/213, 215; D12/167, 168; 267/140, 145

[56] References Cited

U.S. PATENT DOCUMENTS 3,498,252 3/1970 Peacock ..................... 114/219
4,343,258 8/1982 Belvedere ................... 114/219

FOREIGN PATENT DOCUMENTS 530679 8/1954 Belgium ..................... 267/145

Primary Examiner—Sherman D. Basinger
Attorney, Agent, or Firm—Armstrong, Nikaido, Marmelstein & Kubovcik

[57] ABSTRACT

An impact-resistant fender for protecting exposed surfaces such as the hulls of boats from damage when the boat is adjacent to a pier or another boat, which fender is in the form of a tubular structure having at least one groove parallel to the longitudinal axis of the fender and at least one groove formed on a cord of the tubular fender element. The fender elements may be formed with projections from the end of the element to interconnect with other tubular fender elements and the fender elements may be connected head to head through an adapter. The longitudinal groove is sized so that the individual fender elements may be affixed to piping such as that which is used for a boat handrail for accessible storage when not in use.

5 Claims, 7 Drawing Figures

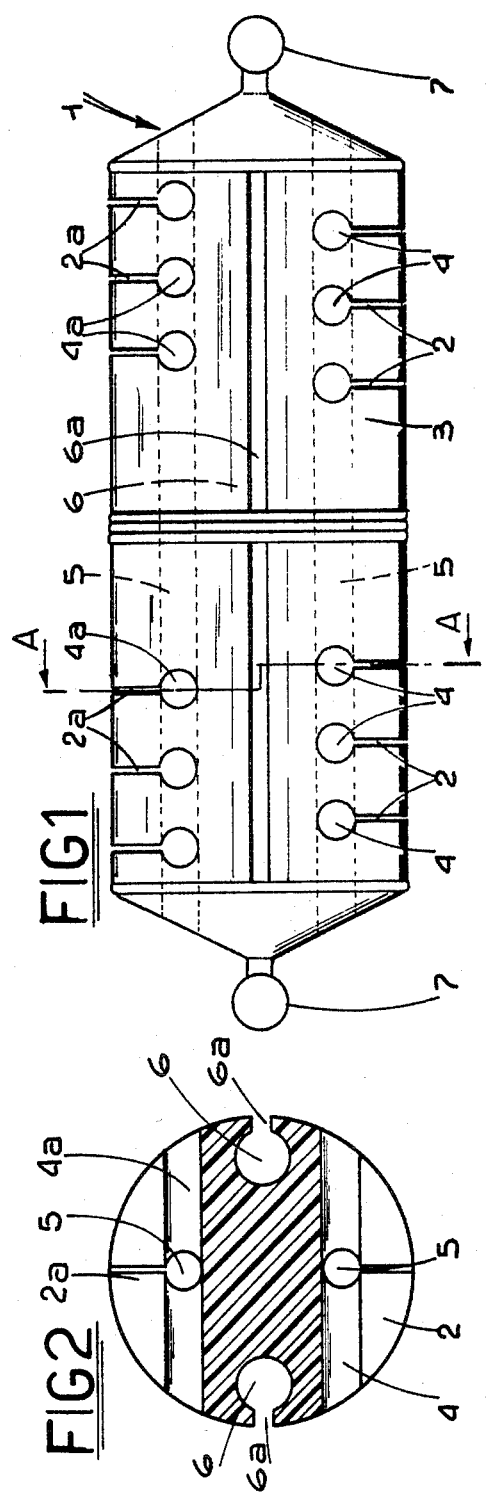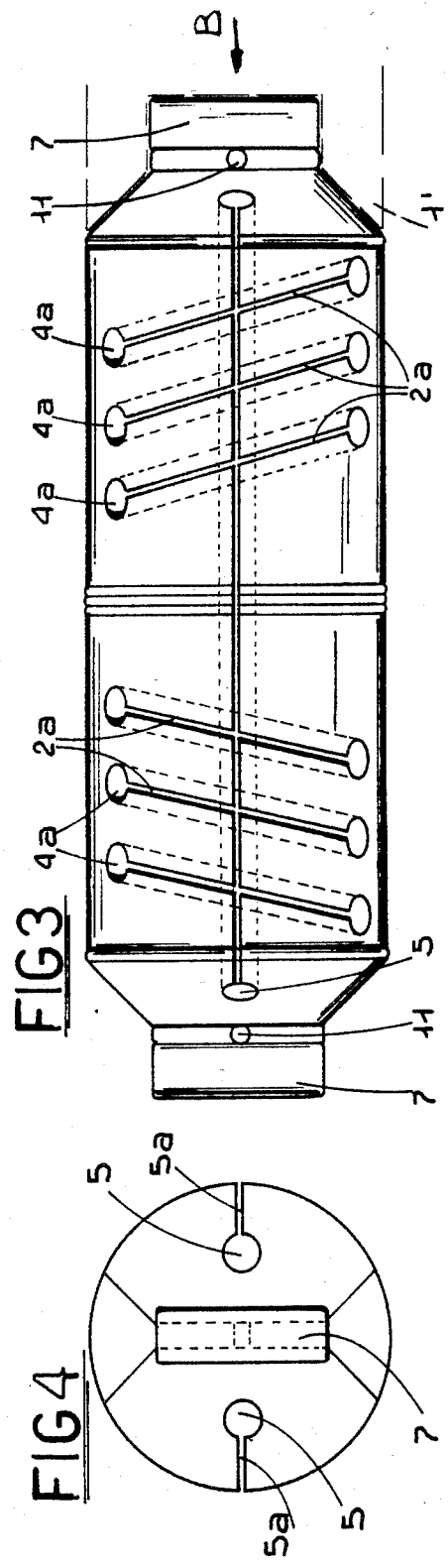

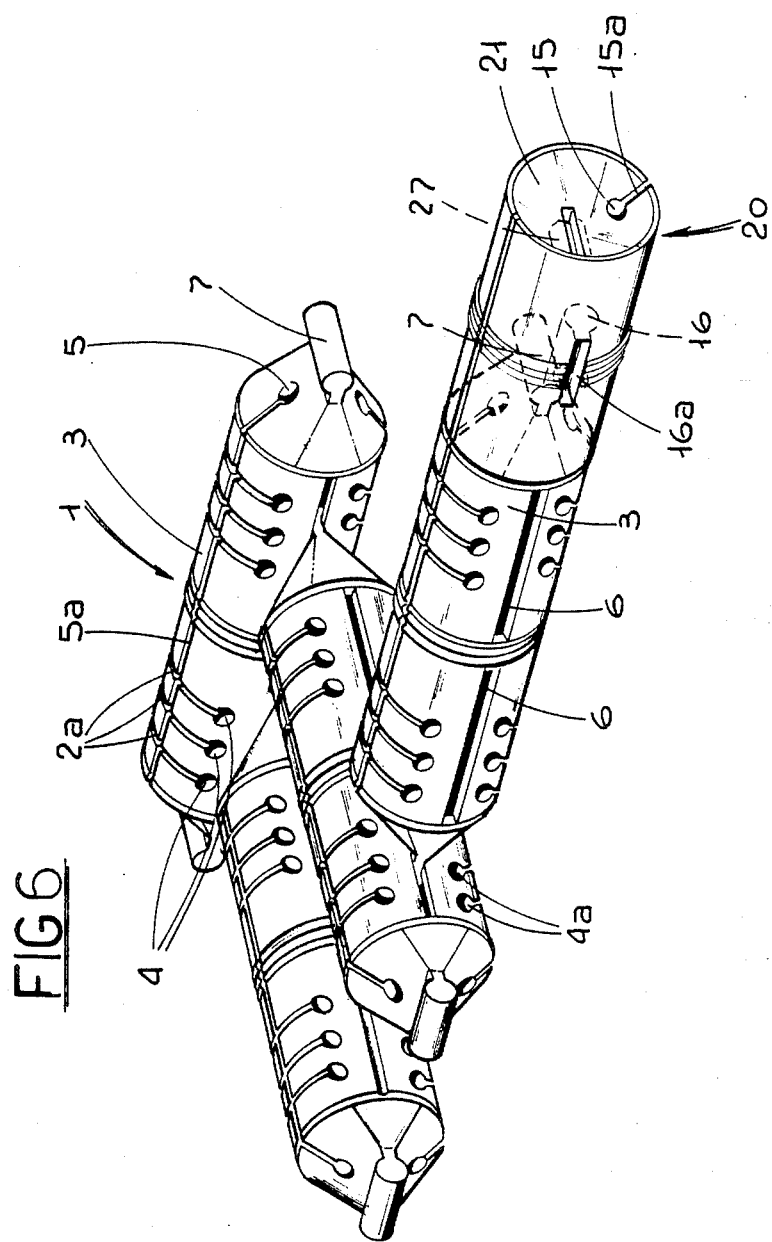

MUTUAL AND MULTI-RESTRAINED FIXING FENDER

FIELD AND BACKGROUND OF THE INVENTION

The present invention relates to a mutual and multi-restrained fixing fender classified as an accessory for navigation.

It is known that a fender is a round or cylinder-shaped protection hung over vessel's sides in order to deaden impacts and possible frictions. Usually round-shaped fenders, more particularly in the form of a drop, are used for big boats and are made of sufficiently stiff material while cylinder-shaped fenders of an elongated form and normally used in small and medium-sized vessels, are usually made of light elastic material (rubber or plastic material) and, for the purpose of reducing prices, have a weak thickness and are blown up.

Both first and second fenders are hung over vessel's sides by means of lines fixed to the vessel's handrail or protection in their use condition, that is when the vessel has to dock next to other ships. On the contrary, during navigation or when the vessel is not going to moor in a port, that is in the case of anchor-moorings, fenders become unnecessary and bothering if hung overboard so that it is necessary to hoist them on-board in order to arrange them in a fixed position possibly joined together; this is above all necessary when small or medium-sized vessels are concerned as they have a reduced free room.

In any way, there is no possibility for all these types of fenders to be fixedly joined together, unless to have resort to the use of lines (usually the same that keep fenders hung over the vessel's sides) in order to achieve their fixing to each other.

OBJECTS

The main object of the present invention is therefore to obviate the above mentioned drawbacks by providing a fender of simple construction and suitable to be fixedly attached to the differently shaped handrails used on the presently existing boats, no lines or fixing ropes being needed: advantageously said fenders also exhibit means allowing their fastening to each other.

A further object of the present invention is to obtain said fender from an elastic, yielding and above all cheap material.

SUMMARY OF THE INVENTION

These and still further objects that will become more apparent in the following are achieved by a mutual and multi-restrained fixing fender characterized in that it comprises a first element of substantially elongated tubular form, provided with a first series of first tubular grooves that develop according to chords belonging to planes that intersect said element, each of said grooves being provided with a corresponding first slit extending according to transverse planes and over the whole length of the groove, suitable to bring said groove into communication with the outer cylindrical surface; said element being also provided with at least a second tubular groove that develops according to a longitudinal axis of said element, over the whole length thereof, and provided with a second slit similar to the preceding one and extending over the whole length thereof too.

Further features and advantages will become more apparent from the following detailed description of a preferred embodiment of the fender according to the invention, given hereinafter by way of example only with reference to the accompanying drawings.

BRIEF DESCRIPTION OF THE DRAWINGS

FIG. 1 is a side view of the first element of the fender according to the invention;

FIG. 2 is a section taken along line A—A in FIG. 1;

FIG. 3 is a view of the fender itself rotated through 90° with respect to FIG. 1;

FIG. 4 is a front view shown from point B in FIG. 3;

FIG. 6 shows a possible mutual coupling solution between fenders by a restrained fixing;

DESCRIPTION OF THE PREFERRED EMBODIMENT

Figure 5:
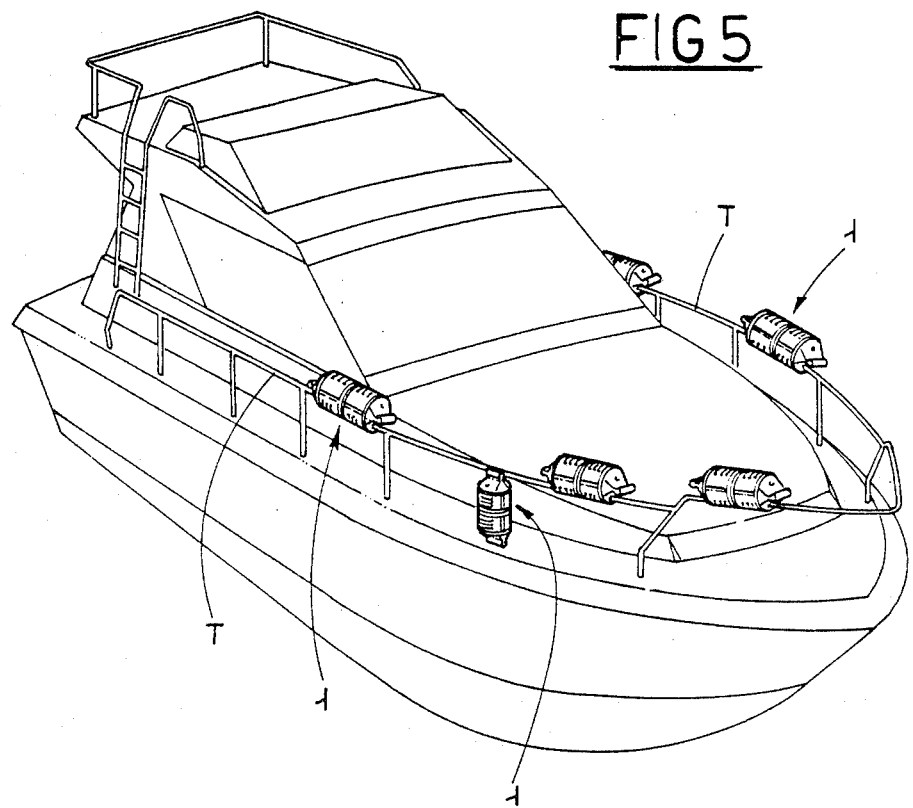
FIG. 5 is a diagrammatic view of the fender applied to a boat, in a non-use position.

Referring to the drawings, it has been generally indicated at 1 a tubular element forming the first element of a fender according to the invention. Preferably, as shown in FIGS. 1 and 3, it has an elongated cylindrical form according to a side and plan view. Said first element is provided with a first series of first tubular grooves 4 disposed (in the case shown) in sets of three, each set being the mirror image of another with respect to a transverse plane of symmetry, said grooves being parallel to each other. The tubular grooves 4 substantially develop according to chords belonging to planes that transversely intersect element 1. Each of said tubular grooves 4 is provided with corresponding slits 2 that develop according to transverse planes too cover the whole length of said grooves 4 so that they are brought into communication with the cylindrical outer surface 3. Said grooves are adapted to receive corresponding counter-shaped tubular elements T generally constituting the boats' handrails and that will get engaged therewith by a restrained coupling, as will be seen later.

Element 1 also comprises a second series of first grooves or sets of three tubular grooves 4a and slits 2a similar to the first ones, that develop according to chords belonging to planes that intersect the element obliquely; more particularly, as shown in FIG. 3, the two triads are disposed symmetrically with respect to the transverse plane dividing the element centrally and in each triad grooves are parallel to each other.

Element 1 also comprises a pair of second tubular grooves 5 and respective slits 5a similar in size to the preceding ones but developing longitudinally over the whole length thereof and a further series of third tubular grooves 6 and respective slits 6a disposed longitudinally too and diametrically opposed and separated by equal distance from the preceding ones.

The sectional dimensions of the second pairs of grooves 5 and slits 5a are almost similar to those of the above mentioned grooves 4 and 4a and respective slits 2 and 2a while the series of third grooves 6 and slits 6a have bigger sizes, as shown in FIG. 2, so that they can tightly receive countershaped projections 7 obtained at the ends of element 1 or fender, according to diametrical directions.

The use of the fender in question appears very clear from what is shown in FIGS. 5 and 6; in fact, owing to the presence of the longitudinal grooves 5 and transverse grooves 4 and 4a it is possible to fixedly secure the fender to the tubular element T of the boat's handrail, this operation being very simple and quick; in fact, it is sufficient to dispose the slit in the direction of the tubular element T and exert pressure on the fender itself up to the obtention of the elastic deformation of the material (which may be integral polyurethane, for example), so that a tight insertion of said tubular element T at the inside of the respective fender grooves 4, 4a, 5 is obtained.

The presence of differently oriented grooves 4, 4a, 5 allows the fender to be fastened not only along horizontal or vertical tubular elements but also where the same cross each other so that the best fastening is obtained. The different orientation given to grooves 4, 4a depends upon the different types of crossing exhibited by the handrails normally used which may be at right angles or at a certain angle, generally respecting the inclination given to grooves 4a. If required, the latter might have different inclinations for each triad in order to best suit the corresponding inclinations of the handrails.

In FIG. 6 it is shown how to join similar fenders to one another according to what is seen by means of a mutual and restrained coupling between projections 7 and grooves 6; advantageously, a user in these conditions will be able to make up groups of fenders in the shape of cushions or mattresses which, on the one hand, reduce the possibility of scattering the single fenders and, on the other hand, might be used as life-buoys too, being said fenders made of a floating material.

Figure 7:
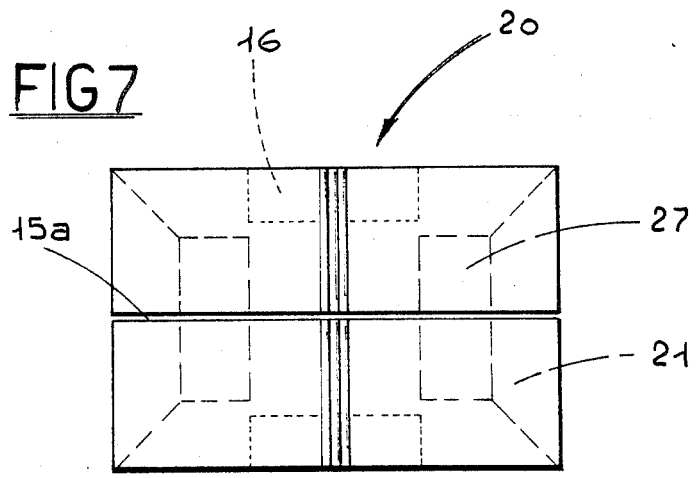
FIG. 7 is a side view of the second element of the fender according to the invention.

Furthermore, said element 1 or fender, in use, could also take geometrical forms different from what is shown (it could have a square section, for example); besides, said element 1 might be provided with a hole 11 either obtained in the vicinity of each projection 7 or disposed in the middle and longitudinally, allowing the free passage of a line; it will also be possible to envisage the construction of a second element 20 having transverse dimensions quite similar to those of said first element 1, being however provided, at its opposite free ends, with recesses 21, 27 countershaped with respect to the conical and tubular projections 7 of the first element 1 (see FIG. 7). In this way, the "female" element could be engaged by means of a lengthwise coupling, with other "male" elements in order to obtain fenders having different axial dimensions, at will.

Practically, the materials used as well as the shapes and sizes may be whatever according to the requirements.

What is claimed is:

1. An impact-resistant fender for protecting the exposed surface of a manufactured article from abrasion, said fender element comprising:
   (a) at least one tubular element formed from a resilient, impact-resisting material, having a longitudinal axis;
   (b) at least one groove formed within said tubular element having a circular interior portion and a slot portion communicating with the surface of said element and being aligned as a chord of the tubular element;
   (c) at least one second groove formed within said tubular element having a circular interior portion and a slot portion communicating with the surface of said element and being aligned parallel to the longitudinal axis of said tubular element along the plane of a diameter of said tubular element.

2. The impact-resistant fender according to claim 1 wherein said grooves are sized to receive portions of the handrail of a boat.

3. An impact-resistant fender for protecting the exposed surface of a manufactured article from abrasion, said fender element comprising:
   (a) at least one tubular element formed from a resilient, impact-resisting material, having a longitudinal axis;
   (b) a plurality of grooves formed within said tubular element each having a circular interior portion and a slot portion communicating with the surface of said element and being aligned symmetrically as chords of the tubular element;
   (c) at least one second groove formed within said tubular element having a circular interior portion and a slot portion communicating with the surface of said element and being aligned parallel to the longitudinal axis of said tubular element along the plane of a diameter of said tubular element;
   (d) at least one third groove formed within said tubular element having a circular interior portion and a slot portion communicating with the surface of said element and being aligned in the plane of a diameter of said tubular element which is perpendicular to the plane in which said second groove lies; and wherein each of said tubular elements has at least one projecting end portion parallel to the plane of said third groove, having flat upper and lower surfaces and terminating in a tubular end cap having a diameter no greater than the diameter of at least one of said first, second and third tubular grooves.

4. A fender system for protecting the exposed surface of a manufacture article comprising a plurality of elements according to claim 3, fixedly interlocked with each other to provide a flexible fender system arrayed upon a surface.

5. A connector for the fender system according to claim 4, comprising:
   (a) a tubular element formed from a resilient, impact-resisting material, having a longitudinal axis;
   (b) at least one first groove formed within said tubular element having a circular interior portion and a slot portion communicating with the surface of said element and being aligned parallel to the longitudinal axis of said tubular element along the plane of a diameter of said tubular element; and
   (c) at least one recess formed in the end of said tubular element, terminating in a groove having a circular interior portion and a slot portion communicating with said recess, said groove being aligned in the plane of a diameter of said tubular element and perpendicular to the longitudinal axis of said element.

* * * * *